(12) United States Patent
Chien

(10) Patent No.: US 8,155,433 B2
(45) Date of Patent: Apr. 10, 2012

(54) METHOD OF OBJECT LOCATION IN AIRBORNE IMAGERY USING RECURSIVE QUAD SPACE IMAGE PROCESSING

(75) Inventor: Greg T. H. Chien, Bolingbrook, IL (US)

(73) Assignee: Goodrich Corporation, Charlotte, NC (US)

( * ) Notice: Subject to any disclaimer, the term of this patent is extended or adjusted under 35 U.S.C. 154(b) by 895 days.

(21) Appl. No.: 12/218,097

(22) Filed: Jul. 10, 2008

(65) Prior Publication Data

US 2010/0008565 A1    Jan. 14, 2010

(51) Int. Cl.
*G06K 9/00* (2006.01)
*G08G 1/16* (2006.01)

(52) U.S. Cl. .................. 382/154; 701/301

(58) Field of Classification Search .......... 382/154, 382/280, 293; 701/301; 707/999.1
See application file for complete search history.

(56) References Cited

U.S. PATENT DOCUMENTS

| | | | |
|---|---|---|---|
| 5,355,442 A | 10/1994 | Paglieroni et al. | 345/427 |
| 5,422,989 A | 6/1995 | Bell et al. | 345/689 |
| 5,550,937 A | 8/1996 | Bell et al. | 382/293 |
| 5,596,494 A | 1/1997 | Kuo | 702/2 |
| 5,633,946 A | 5/1997 | Lachinski et al. | 382/103 |
| 5,796,879 A | 8/1998 | Wong et al. | 382/300 |
| 5,995,681 A | 11/1999 | Lee et al. | 382/293 |
| 6,064,760 A | 5/2000 | Brown | 382/154 |
| 6,278,798 B1 | 8/2001 | Rao | 382/154 |
| 6,282,496 B1 | 8/2001 | Chowdhary | 701/220 |
| 6,504,957 B2 | 1/2003 | Nguyen et al. | 382/209 |
| 6,512,857 B1 | 1/2003 | Hsu et al. | 382/294 |
| 6,587,601 B1 | 7/2003 | Hsu et al. | 382/294 |
| 6,597,818 B2 | 7/2003 | Kumar et al. | 382/294 |
| 6,735,348 B2 | 5/2004 | Dial, Jr. et al. | 382/293 |
| 6,795,590 B1 | 9/2004 | Chen | 382/294 |
| 6,810,153 B2 | 10/2004 | Komura et al. | 382/295 |
| 6,853,332 B1 * | 2/2005 | Brookes | 342/191 |

(Continued)

OTHER PUBLICATIONS

U.S. Appl. No. 11/222,562, filed Sep. 8, 2005, titled "Precision Optical Systems with Performance Characterization and Uses Thereof".

(Continued)

*Primary Examiner* — Vu Le
*Assistant Examiner* — Amara Abdi
(74) *Attorney, Agent, or Firm* — McDonnell Boehnen Hulbert & Berghoff LLP

(57) ABSTRACT

A method and computer workstation are disclosed which determine the location in the ground space of selected point in a digital image of the earth obtained by an airborne camera. The image is rectangular and has four corners and corresponds to an image space. The image is associated with data indicating the geo-location coordinates for the points in the ground space corresponding to the four corners of the image, e.g., an image formatted in accordance with the NITF standard. The method includes the steps of: (a) performing independently and in parallel a recursive partitioning of the image space and the ground space into successively smaller quadrants until a pixel coordinate in the image assigned to the selected point is within a predetermined limit ($\Delta$) of the center of a final recursively partitioned quadrant in the image space. The method further includes a step of (b) calculating a geo-location of the point in the ground space corresponding to the selected point in the image space from the final recursively partitioned quadrant in the ground space corresponding to the final recursively partitioned quadrant in the image space. The methods are particularly useful for geo-location from oblique reconnaissance imagery.

18 Claims, 6 Drawing Sheets

U.S. PATENT DOCUMENTS

| | | |
|---|---|---|
| 7,233,691 B2 | 6/2007 | Setterholm .................. 382/154 |
| 7,310,440 B1 | 12/2007 | Dolloff ........................ 382/154 |
| 7,395,156 B2 | 7/2008 | Chiou et al. ................. 701/301 |
| 7,397,970 B2 | 7/2008 | Han et al. ..................... 382/281 |
| 7,406,196 B2 | 7/2008 | Albertelli et al. ............ 382/199 |
| 7,424,133 B2 | 9/2008 | Schultz et al. ............... 382/106 |
| 2001/0036302 A1 | 11/2001 | Miller .......................... 382/128 |
| 2002/0072869 A1 | 6/2002 | Stiller ............................. 702/90 |
| 2003/0044085 A1* | 3/2003 | Dial et al. .................... 382/293 |
| 2003/0044985 A1* | 3/2003 | Jaroszeski et al. ........... 435/461 |
| 2003/0081833 A1* | 5/2003 | Tilton ........................... 382/173 |
| 2004/0105090 A1* | 6/2004 | Schultz et al. ............ 356/141.5 |
| 2004/0208350 A1 | 10/2004 | Rea et al. ..................... 382/128 |

OTHER PUBLICATIONS

Samet, H., "*Applications of Spatial Data Structures: Computer Graphics, Image Processing, and GIS*", 1990, Addison-Wesley, Reading, Massachusetts, pp. 1-27, 225-266.

International Search Report and Written Opinion mailed Jul. 23, 2009 in PCT/US09/03416 filed Jun. 4, 2009.

Gonzalez and Woods, *Digital Image Processing*, Addison-Wesley Publishing Company, p. 51-71 (1992).

Mikhail and Theiss, Presentation entitled "*What Are, and Why, Sensor Models*" presented to CSMWG Inaugural Meeting, San Diego, CA, Feb. 21, 2006.

Samet, Hanan, *Applications of Spatial Data Structures, Computer Graphics, Image Processing, and GIS*, p. 329-346, Addision-Wesley Publishing Company, (1989).

* cited by examiner

METHOD OF OBJECT LOCATION IN AIRBORNE IMAGERY USING RECURSIVE QUAD SPACE IMAGE PROCESSING

BACKGROUND OF THE INVENTION

This invention relates generally to the fields of aerial surveillance and mapping from aerial photography. In particular, the invention relates to a method of determining the geo-location (e.g., longitude and latitude coordinates) of any arbitrary point in a photograph of the Earth's surface taken by a digital camera in an airborne vehicle or satellite. The method is particularly useful for geo-location from oblique imagery.

The known prior art includes several references related to the problem of locating coordinates of a selected point on the ground within imagery obtained from an airborne camera. The prior art of interest includes U.S. Pat. No. 6,735,348 to Dial, Jr. et al.; U.S. Pat. No. 5,633,946 to Lachinski et al., U.S. Pat. No. 7,233,691 to Setterholm; and U.S. Pat. No. 5,596,494 to Kuo.

Prior art methodologies typically accomplish the task by calculating the location of the airborne platform using the onboard inertial navigation system (INS), followed by one of the two means: 1) Parametric Model: constructing a parametric representation of the camera and solving the coefficients in the mathematical model by using the airborne platform locations and known ground control points (GCP) in multiple captured images. Once the mathematical model is obtained and fine tuned, the ground coordinates of a point in any photograph taken subsequently can be derived by piping the coordinates of the input point and the platform location through the mathematical model, and 2) Physical Model: referencing the airborne platform location to the image detector focal plane array within the camera, and then linearly projecting the captured airborne image represented by the pixels of the array onto the ground space. The ground location of an image pixel can be obtained by this light ray tracing method, which relies on the physical properties of the camera, its location and line of sight when the image is collected. Typically, the ground geo-locations of the four corners of images are calculated during image acquisition and annotated for post-processing. With the four corner geo-locations, a linear interpolation method is then used to find the ground locations of selected interior points in the image, represented by the corresponding pixels on the detector array. The linear interpolation method scales the image space detector pixels with a pair of linear factors in the longitude and latitude directions to find the coordinates of the pixels proportionally in the ground space. While this method gives satisfactory results for imagery captured vertically or perpendicular (at nadir) to the platform, it produces significant error when imagery is captured at angles forward oblique or side oblique relative to the platform. This error is due to the progressive scaling characteristics intrinsic to oblique images, and the application of linear interpolation techniques introduces approximation errors along the vanishing lines.

The error produced by using linear interpolation to geo-locate objects in oblique imagery stems from the fact that the field of view (FOV) of an obliquely captured image can be described as having a trapezoidal shape relative to the ground, when defined by the far and near corner points. However, the FOV of imagery captured at nadir appears square shaped since the near and far corner points are equidistant from the center of the image. As the angle of capture relative to the platform nadir increases (i.e., the angle is progressively oblique), the error contained in coordinates of a linearly projected image point on the ground also increases. Thus, it can be demonstrated that using the linear interpolation method of the prior art to map obliquely captured airborne image space onto ground space for the purpose of locating an object point on the ground produces errors in geo-location, with the magnitude of the errors increasing as the angle becomes more oblique.

Another prior art method of performing geo-location from imagery is a warping technique in which images are warped to a world coordinate space such as WGS 84. In this method, a mapping is performed of the image either linearly or non-linearly with warping to a display space representing the world coordinate space and then performing linear interpolation in the display space. When non-linear algorithms are used, the resulting coordinates are more precise. However, this technique requires image warping, which distorts objects and scenes in the image and is computationally time consuming.

Another method is a raytracing technique that requires the use of a camera model that defines and simulates the characteristics of the camera. In this method, the camera optical and geometrical model is used to derive the projected location from the image pixel in the focal plane to the point on the ground. In addition to the camera model, this technique also requires the location (longitude, latitude, and altitude) of the camera and use of a certain Earth model (Flat, Spherical, Ellipsoid, etc.). The need for the above information greatly limits the usefulness of this method for general application to oblique imagery because the camera model for each image being exploited needs to be identified.

To precisely acquire the geo-locations of four corners and/or any selected point from imagery, another method is described in the patent application of Reneker, et al., U.S. Ser. No. 11/222,562 titled "Precision Optical Systems with Performance Characterization and Uses Thereof" which is assigned to the assignee of present applicant, Recon/Optical Inc. Reneker et al. describes a method for locating a point on the ground within the airborne captured imagery by first characterizing, in real time, the overall optical system which has captured the imagery. The characterization data is then used to correct the optical projection of the light rays of any ground point in the imagery onto an image detector focal plane array which has had its pixel elements accurately referenced to inertial space coordinates by an onboard inertial measurement unit and a beam collimator which projects calibration points onto the detector array. This method accurately accomplishes the location task totally within the airborne platform.

Other prior art of interest include the following text books: Samet, H., "Quad-Tree Representations of Image Data: The Design and Analysis of Spatial Data Structures", 1990, Addison-Wesley, Reading, Mass., and Samet, H., "Applications of Spatial Data Structures: Computer Graphics, Image Processing, and GIS", 1990, Addison-Wesley, Reading, Mass. These books describe quad-tree and oct-tree structures for representing 2-dimensional and 3-dimensional objects in raster (pixel or voxel) formats. The applications shown in the books use such structures in computer data representations for performing data compression, window clipping, linear image transformations, raytracing for image rendering, and finding distances among tree nodes. The associated technique of quad-tree partitioning of images, where images are divided into quadrants for subsequent image processing, is a common practice in computer graphics. However, the application of quad-tree partitioning in parallel for comparing images in image space (discrete, integer) to oblique images in ground space (continuous, real) in order to find and match locations in each space, as described in the present invention, is believed to be entirely novel and nonobvious.

Current reconnaissance cameras used in military applications supply imagery to a ground station in a data format that is known as NITF (National Imagery Transmission Format). The National Imagery Transmission Format Standard (NITFS) is a suite of standards for formatting digital imagery and imagery-related products and exchanging them among the Department of Defense, other intelligence community members, and other United States Government departments and agencies. Resulting from a collaborative US Government and industry effort, it is the common standard used to exchange and store files composed of images, symbols, text, and associated data. Persons skilled in this art are familiar with the NITF standards. In practice, a reconnaissance camera in compliance with NITF includes an image processing unit that computes the longitude and latitude coordinates of the four corner points of the captured ground space image using known information such as camera location and orientation, depression angle, altitude, and field of view. The image processing unit then inserts the calculated ground coordinates of the image corner points into the NITF data header for a ground station to read and use in operation, e.g., by a geo-location algorithm to locate objects within the imagery as described in the prior art and in this disclosure.

The present invention provides a more accurate method for geo-locating points of interest in oblique aerial reconnaissance imagery than those methods of the prior art which are based on linear interpolation. Furthermore, the method described in the present invention is particularly useful in that it does not require characterization of the camera optical system or use of a camera model and is applicable to any digital image captured at an oblique angle where the geo-location of the corner points in the image is known, e.g., in images annotated in accordance with the NITF standard.

SUMMARY OF THE INVENTION

In a first aspect, a method is disclosed for determining the location in ground space coordinates of a selected point contained in a digital image of the earth's surface captured by an airborne reconnaissance camera oriented toward the ground at an oblique angle. The captured image is rectangular (having four corners) and corresponds to an image space defined by the image detector in the camera. Additionally, the reconnaissance image includes data indicating the geo-location coordinates for the points in the ground space corresponding to the four corners of the image.

The method includes a step of performing independently and in parallel a recursive partitioning of the image space and the ground space into quadrants. The partitioning of the image and ground space into quadrants proceeds in a manner such that successively smaller quadrants are produced, one in the image space containing the selected point, and one in the ground space containing the corresponding point in the ground space. In each iteration of the recursive algorithm, the geo-location of the corner points for each new ground space is recalculated. The recursive partitioning proceeds until the a pixel coordinate in the image space assigned to the selected point is within a predetermined limit ($\Delta$) of the center of a final recursively partitioned quadrant in the image space. The limit A may, for example, be one pixel or a fraction of a pixel (sub-pixel resolution). The method then calculates the geo-location (longitude and latitude coordinates) of the selected point in the final recursively determined ground space quadrant corresponding to the selected point in the image space and center of the final recursively determined image space quadrant within the set limit.

This recursive quad space geo-location method is particularly useful in conjunction with digital reconnaissance images formatted in accordance with the NITF standard, where compliant images include geo-location data for the four corner points of the image.

The method of the present invention can be executed in a variety of platforms. For example, it can be performed by a computing and display platform incorporated into the camera system. It can also be performed by a ground station receiving and displaying the images directly or indirectly from the aerial reconnaissance vehicle. It can also be performed by a stand-alone workstation which can store and display images designated by the operator. For example, the workstation may be an image exploitation station which is used by a photo interpreter. As another example, the workstation may be included in a land, sea or airborne vehicle, system, or unit.

In one embodiment, the parallel recursive partitioning step includes several substeps:

1) calculating the intersection of two diagonal lines in the ground space;

2) finding the center point in the image space by equal subdivision;

3) determining whether the pixel coordinates of a selected point in the image in image space is within the predetermined limit ($\Delta$) of the image center point in step 2), and if not, then:

4) finding the quadrant in the image space that contains the selected point using the center determined in 2);

5) reducing the image space into a new image space corresponding to the quadrant determined in step 4);

6) calculating the coordinates of the selected point in the new reduced image space quadrant;

7) finding the quadrant in the ground space corresponding to the quadrant determined in step 4);

8) reducing the ground space into a new ground space corresponding to the found quadrant in step 7);

9) calculating the geo-location coordinates of the corners of the new ground space found in step 8); and 10) repeating steps 1-9 until the determination at step 3) is answered in the affirmative.

In another aspect, an image processing apparatus is provided having a processing unit, a machine-readable memory, and a display. The memory stores a digital image of the earth's surface obtained by a camera oriented at an oblique angle, the image comprising a rectangular image having four corners and corresponding to an image space. The display is provided for displaying the digital image and a cursor which is movable by a user over the image to thereby select a desired point within the image. The memory further stores data associated with the image including the geo-location coordinates for the points in the ground space corresponding to the four corners of the image. The memory further stores processing instructions for execution of the following steps:

(a) performing independently and in parallel a recursive partitioning of the image space and the ground space into quadrants until a pixel coordinate in the image assigned to the selected point is within a predetermined limit ($\Delta$) of the center of a final recursively partitioned quadrant in the image space, (b) calculating a geo-location of the point in the ground space corresponding to the selected point in the image space from the final recursively partitioned quadrant in the ground space corresponding to the final recursively partitioned quadrant in the image space; and (c) displaying the geo-location calculated in step (b) on the display.

In still another aspect, an improved workstation configured to display a digital oblique aerial camera image and provide geo-location coordinates for a selected point in the image is provided. The improved workstation is configured to perform the geo-location using as inputs the pixel coordinates in image space of a selected point in the image and the geo-location coordinates in ground space of the four corners of the image. Additionally, the workstation performs independently and in parallel a recursive partitioning of the image space and the ground space into quadrants until a limit is reached, and calculates a geo-location in the ground space for a point corresponding to the selected point in the image when the limit is reached.

In the above embodiments, the workstation provides a display of the oblique image and allows an operator to select any arbitrary point in the image, and the display indicates the longitude and latitude of the selected point with greater accuracy than previous methods that are based on linear interpolation. Furthermore, the method and workstation are readily adaptable to perform the methods on any oblique digital image, from any suitable reconnaissance camera which includes the initial geo-location data of the corner points, without requiring knowledge of the camera model or its optical performance characteristics. One skilled in the art will also recognize that the method of the present invention can also apply to non-oblique or nadir captured images as well. Thus, the methods of this disclosure are much more flexible and of wider applicability to digital imagery than many prior art methods.

DETAILED DESCRIPTION OF THE PREFERRED EMBODIMENT

Overview

Figure 1:
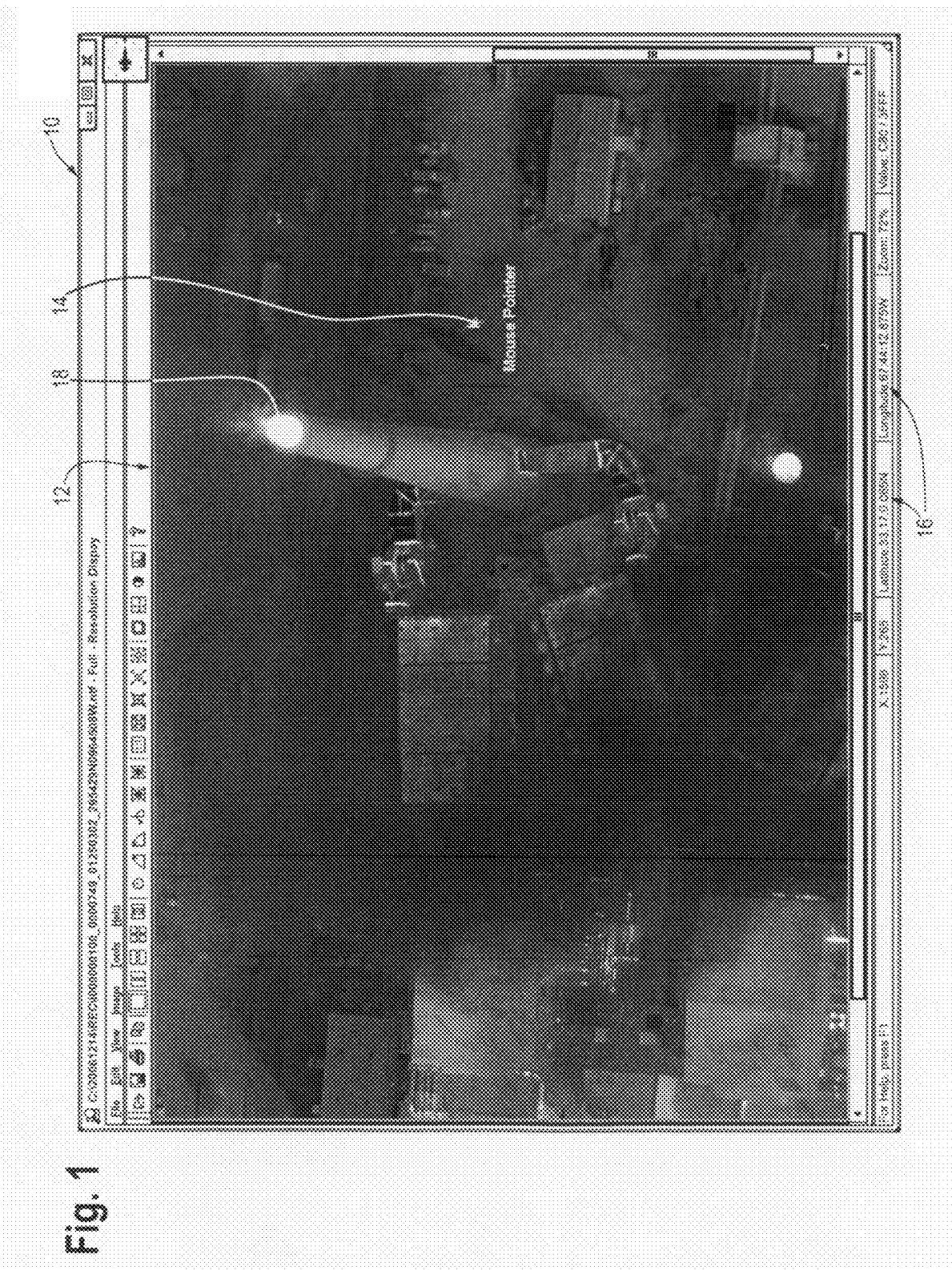
FIG. 1 is a sample screen shot of the display of an image exploitation station (computer workstation) showing oblique imagery generated by an aerial reconnaissance camera. The user moves the cursor with a mouse to any arbitrary point in the image and the display shows the longitude and latitude of the selected point as calculated by the method of the present invention.

This invention describes a method of determining the coordinates of a selected point on the ground within obliquely captured imagery by using the known geo-coordinates of the corner points of the ground image, e.g., provided in a NITF header associated with the image. The technique described in this disclosure eliminates the requirement of a-priori knowledge of the camera mathematical model for ray tracing through optical geometry, and eliminates the error introduced by the geometrics of the obliquely captured imagery since it does not calculate the location of the selected object point using a linear interpolation method.

The locations of the corner points of the imagery can be found by any suitable method, including known methods of the prior art using the platform location data to calibrate the center of the focal plane array and then using spherical trigonometry to project the corner pixels of the array onto the ground in conjunction with an overlaid ground coordinate system such as World Geodetic System (WGS) 84. The distortion introduced by the optical system is not a factor in these methods or the method of the present invention, since only the corners of the optics are used, where the distortion is known, consistent, and can be factored out.

Given the coordinates of the corners of the ground space image and the selected pixel location in the image space that is of interest, as inputs, the geo-location of the point in the ground space corresponding to the selected point in the image space is then determined by mathematically applying a recursive quad space image processing algorithm independently and in parallel to the image space and ground space imagery data that is bounded by the four image corner location points. Basically, in this technique (described in detail in FIGS. 7, 8 and 9) the method performs independently and in parallel a recursive partitioning of the image space and the ground space into successively smaller quadrants until a pixel coordinate in the image assigned to the selected point is within a predetermined limit (Δ) of the center point of a final recursively partitioned quadrant in the image space. While the image space is being recursively divided into quadrants, the ground space is also being divided into corresponding quadrants. The coordinates of the selected point in the image space and the geo-location of the four corner points of the quadrant in the ground space are recalculated for each recursion (iteration) performed. The recursive partitioning calculations of both the image space and the ground space continue until the limit is reached. In one embodiment the limit is reached where the defined image quadrants can no longer be divided as limited by the size of the pixel in the image detector array. This unique method results in accurate geo-location of a ground object point without errors caused by linear interpolation or the need to characterize the camera system and perform corrections over the entire field of view (FOV) of the camera optical system.

Example Embodiments

The method will now be described in conjunction with the appended figures. The method will be described in the context of a side oblique image; however, the method is applicable to a nadir image and any oblique image, including an image obtained in the forward oblique. The nature of the image (e.g., thermal, visible, hyperspectral, etc.) and the nature of aerial reconnaissance camera are not particularly important. The term "aerial reconnaissance image" is intended to encompass an image obtained from an airborne camera or from an orbiting satellite.

FIG. 1 is a screen shot of the display 10 of an image exploitation station (computer workstation) showing an oblique image 12 of the earth generated by an aerial reconnaissance camera. The user moves cursor 14 with a mouse or other pointing device to any arbitrary point in the image. The method of this invention calculates the longitude and latitude of the selected point in the image and displays it as indicated at 16. For example, the user could zoom in or out of the image and pick a target of interest, such as the prominent smoke stack 18 shown in the image, by moving the cursor 14 over the base of the smoke stack 18. The display 16 will then display the longitude and latitude of the smokestack.

The image 12 is preferably obtained by any suitable digital camera from a moving platform, such as a reconnaissance camera placed in an aircraft. The digital camera may take a variety of forms, and incorporate various types of imaging detectors such as an infrared (IR) photodiode array, CCD (charge-coupled device) imager, CMOS image sensor, or other form; but in any case the camera has one or more imaging detectors having imaging elements or pixels which are a rectangular array of pixels arranged in N rows and M columns of pixels. The camera includes an image processing unit which receives inertial navigation system information from the aircraft's inertial navigation system and calculates the geo-location coordinates of the four corners of the image using known methods. The image is supplied to a ground station, e.g., over an air link, in the NITF format. In this format, the image is supplied in digital form along with a header which contains the geo-location coordinates of the four corners of the image.

Figure 2:
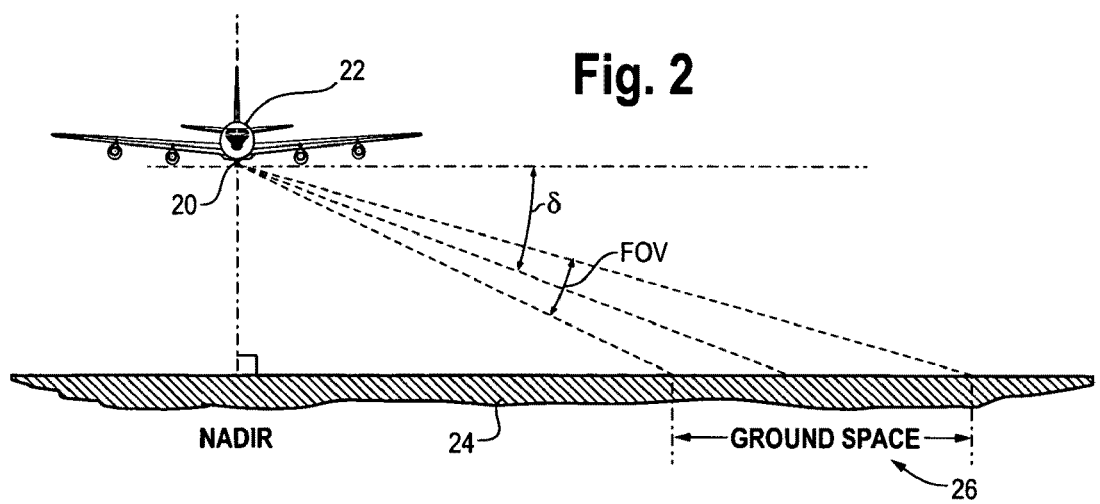
FIG. 2 is a schematic diagram showing an aerial reconnaissance camera aboard a reconnaissance vehicle capturing an image at a camera depression angle 6. The term "ground space" refers the area of the earth that is within the field of view of the camera and thus imaged by the camera.

FIG. 2 is a schematic diagram showing an aerial reconnaissance camera 20 aboard a reconnaissance vehicle 22 capturing an image of the earth 24 at a camera depression angle δ. The term "ground space" 26 as used herein refers the area of the earth 24 that is within the field of view (FOV) of the camera and thus imaged by the camera. When the depression angle δ is 90 degrees, the camera is pointed at nadir and prior art geo-location methods are typically used. While the present invention may also be used with the camera pointed at Nadir, it primarily pertains when the angle is not 90 degrees, and the camera is pointed at depression angles between the horizon and nadir. At these oblique angles, the linear interpolation methods do not work well, as explained previously.

Figure 3:
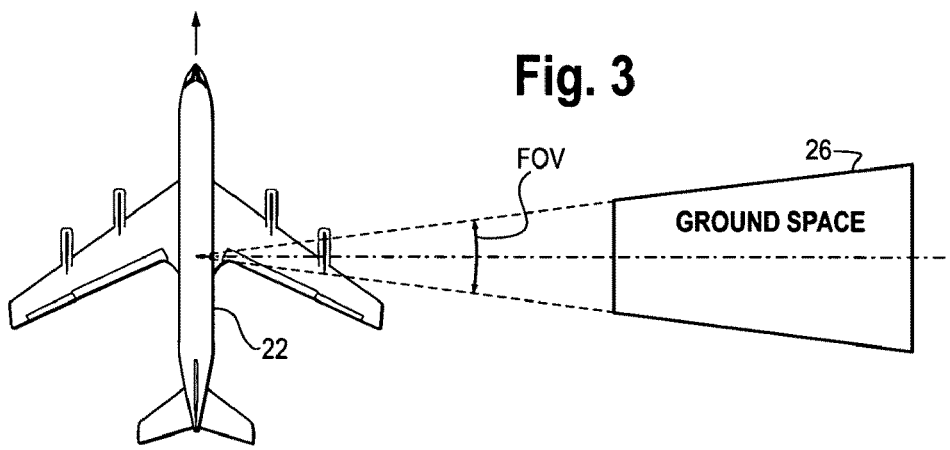
FIG. 3 is another view of the oblique reconnaissance scenario shown in FIG. 2, showing the trapezoidal ground space.

FIG. 3 is another view of the oblique reconnaissance scenario shown in FIG. 2, showing the trapezoidal ground space 26 that occurs when the camera is oriented at an oblique angle.

Figure 4:
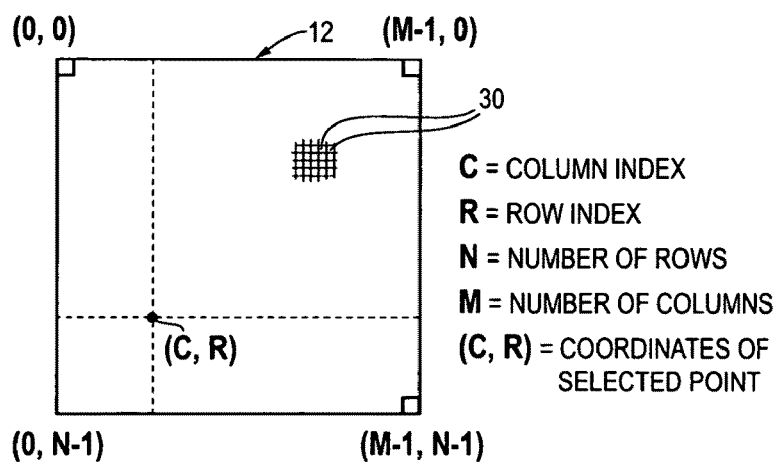
FIG. 4 is a schematic illustration of a rectangular image of rows and columns of picture elements (pixels), which is a standard format for digital images.

FIG. 4 is a schematic illustration of a rectangular image 12 of rows and columns of picture elements (pixels) 30, which is a standard format for digital aerial reconnaissance images. Only a few of the pixels 30 are individually shown, but the image usually has millions of such pixels arranged in a rectangular array of rows and columns. In this document, the following notation is used: There are M pixel columns numbered from 0 to M-1, and there are N rows numbered from 0 to N-1. An individual pixel has an address (C, R), where C represents the column index number and can take any value from 0 to M-1, and R represents the row index number and can take any value from 0 to N-1. The pixel addresses for the four corners of the image are labeled in FIG. 4. When the image 12 of FIG. 4 is displayed such as shown in FIG. 1, the user can move their cursor over the entire image and place it over a given pixel (C, R). The problem solved by this invention is determining the geo-location of the point in the ground space that corresponds to that selected location in the image space.

Figure 5:
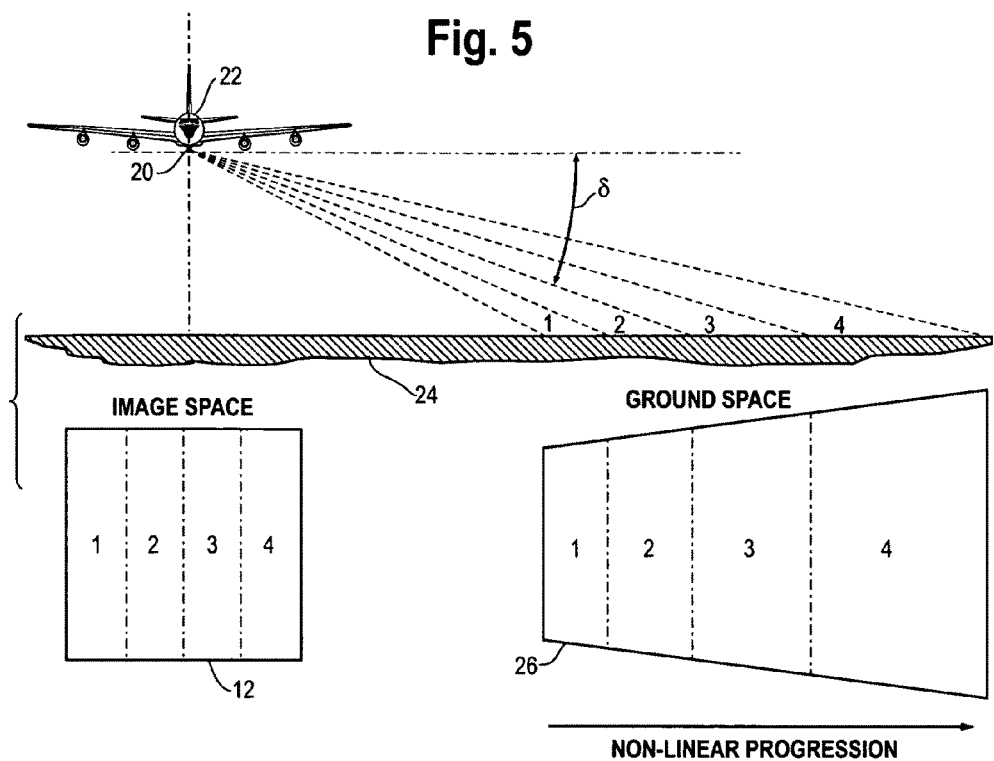
FIG. 5 is an illustration of an airborne camera capturing imagery in a side oblique mode showing the non-linear progression in the ground space covered by four equally divided regions in the image space along the vanishing line. The term "image space" is used interchangeably with the pixel coordinates of the reconnaissance image captured by the imaging detector within the camera.

FIG. 5 is an illustration of a reconnaissance camera 20 capturing imagery in a side oblique mode showing the non-linear progression in the ground space 26 covered by four equally divided regions labeled 1, 2, 3 and 4 in the image space. While the image space or image 12 is divided into four equal sections 1, 2, 3 and 4, the amount of ground covered in the ground space progresses non-linearly between regions 1, 2, 3 and 4 in the ground space. This is particularly so as the depression angle δ decreases producing highly oblique angles.

Figure 6:
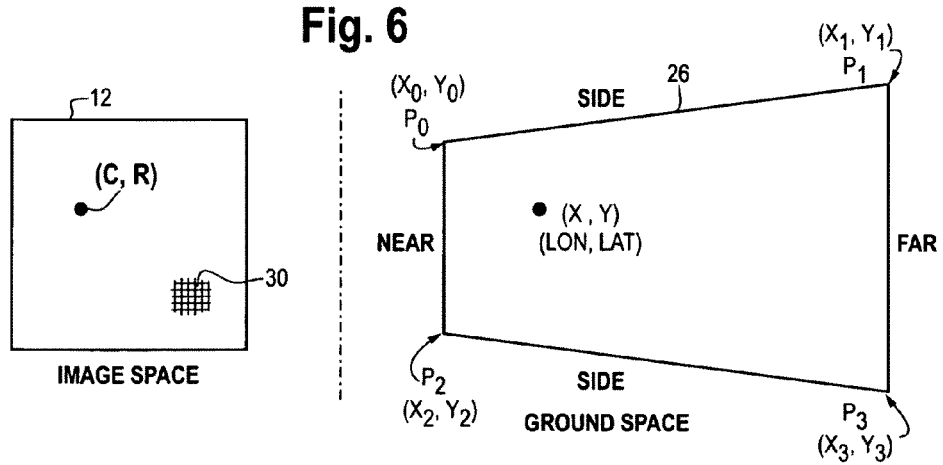
FIG. 6 is a diagram showing both the image space and the ground space for an arbitrary point (C, R) selected in the image space and its corresponding point in the ground space. The problem solved in this invention is the determination of the longitude and latitude coordinates for the point in the ground space (X,Y) corresponding to the selected space (C, R) in the image space.

FIG. 6 is a diagram showing both the image space 12 and the ground space 26 and an arbitrary point (C, R) selected in the image space and its corresponding point (X, Y) in the ground space. The problem solved in this invention is the determination of the longitude and latitude coordinates (LON, LAT) for the point in the ground space (X, Y), corresponding to the selected space (C, R) in the image space. In this example, the four points in the ground space are numbered P0, P1, P2, and P3. Each of the points P0, P1, P2, and P3 has longitude and latitude coordinates, indicated by (X0, Y0) for point P0, (X1, Y1) for point P1, (X2, Y2) for point P2, and (X3, Y3) for point P3. The side of the image parallel to the direction of flight and closest to the aircraft is labeled "near". The side of the image parallel to the direction of flight and farthest from the aircraft is labeled "far". The side of the image connecting the near and far sides of the image and forward of cross-line-of-flight direction is the side that connects points P0 and P1, and the other side aft of the across-line-of-flight direction connects points P2 and P3.

Figure 7:
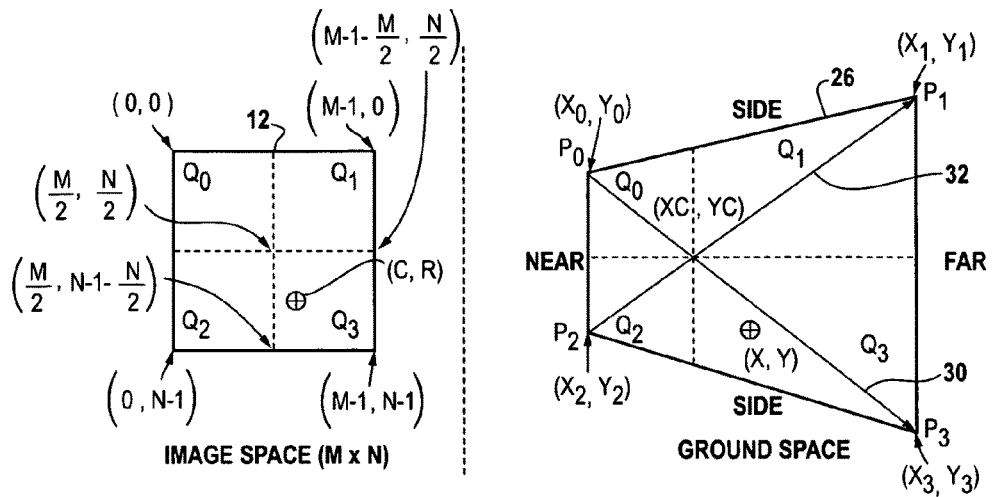
FIG. 7 is a diagram showing the division of the image space and the ground space into quadrants, as part of the recursive quad space image processing method of this disclosure. (XC, YC) designates the intersection of the ground space vectors.

FIG. 7 is a diagram showing the division of the image space and the ground space into quadrants, as part of the recursive quad space image processing method of this disclosure. Basically, in this disclosure the method performs independently and in parallel a recursive partitioning of the image space 12 and the ground space 26 into quadrants Q0, Q1, Q2, and Q3. A search by bounding rectangle, using simple range comparisons along the column and row axes, is conducted to determine in which quadrant of the image the point selected by the user (C, R) is located, and then the corresponding quadrant in the ground space is determined. A new image space and a new ground space are then defined by the resulting quadrants (Q3 in this example). The geo-coordinates of the four corners of the selected quadrant (Q3) in the ground space are calculated.

The same technique applied to partitioning of the image and ground spaces 12 and 26, respectively, repeats in an recursive fashion until a pixel coordinate in the image space assigned to the selected point (C, R) is within a predetermined limit (Δ) of the center point of a final recursively partitioned quadrant in the image space 12. Then, the method calculates a geo-location of the point in the ground space that corresponds to the selected point in the image space from the final recursively partitioned quadrant in the ground space 26 corresponding to the final recursively partitioned quadrant in the image space 12.

An example of the first two iterations of the method will suffice for a general explanation to persons skilled in the art. In FIG. 7, the image space 12 is divided into four equal quadrants Q0, Q1, Q2, and Q3. Similarly, the ground space 26 is divided into quadrants Q0, Q1, Q2, and Q3. The manner in which the ground space is divided is as follows: two diagonal lines 30 and 32 are constructed connecting points P0 and P3 (line 30) and points P2 and P1 (line 32). The intersection of these two lines defines the center point of the image space in the ground space (XC, YC) and the corner point which is common to all four quadrants. The selected point (C, R) is located in quadrant Q3 by the same bounding rectangle search method. The corresponding quadrant Q3 is selected in the ground space. The geo-location of the four corner points in Q3 in the ground space 26 is then calculated. The location of P3 is already known, the other three corners are calculated as explained below. The process then repeats with quadrant Q3 in the image space as the new image space and quadrant Q3 in the ground space as the new ground space, and the location of the corner points of quadrant Q3 in the ground space, becoming the initial inputs.

Figure 8:
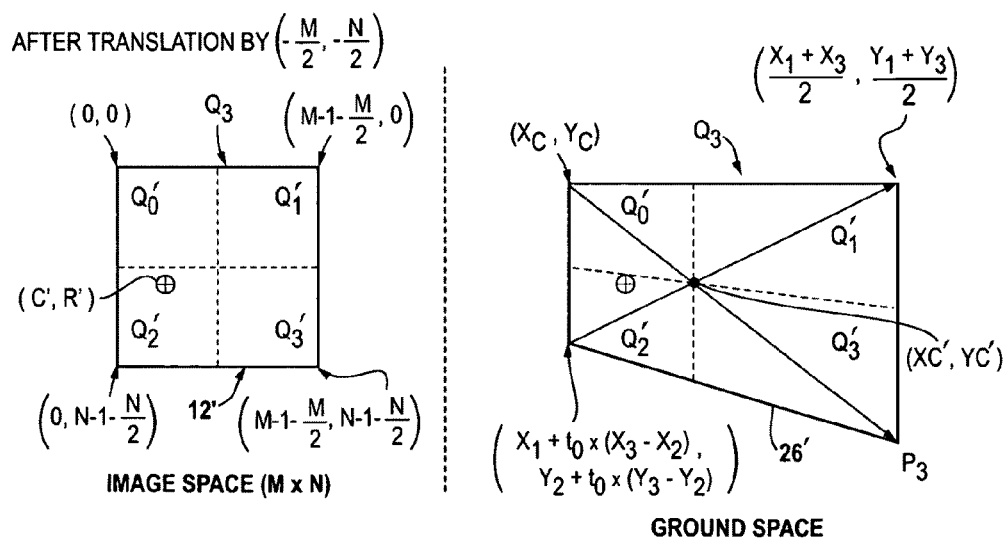
FIG. 8 is a diagram of the new image space and the new ground space after one iteration of the recursive quad space image processing method, showing the new image space and the new ground space re-divided into quadrants in readiness for a second iteration of the recursive quad space image processing method.

FIG. 8 is a diagram of the new image space 12' and new ground space 26' after one iteration of the recursive quad space image processing method. The coordinates for the corners of the image space 12' and the ground space 26' are shown in the diagram. A translation occurs for the quadrant Q3 in the image space to bring the upper left hand corner to have coordinates (0, 0). The new coordinates for quadrant Q3 are shown in FIG. 8 after translating by (−M/2, −N/2). The new image space 12' and new ground space 26' are divided into quadrants Q0', Q1', Q2', Q3', in the second iteration of the recursive quad space image processing method. The original user selected point (C, R) is also translated by the same (−M/2, −N/2) amount to (C', R'), relative to the new origin. The point (C', R') is now in quadrant Q2' of the image space 12', which corresponds to quadrant Q2' in the ground space 26'. A test is then performed to see if the point (C', R') is in the center of the image space quadrant (or other limit criterion to satisfy and end the recursive process). Since the point (C', R') is not at the exact center of the image space 12', the algorithm then goes into a deeper level of recursion, with the new image space being quadrant Q2' and the new ground space being quadrant Q2' in the ground space 26'. The division of these new quadrants into further sub-quadrants continues in a recursive fashion until a defined limit (Δ) is reached. The limit depends on how fast the designer of the program wants the algorithm to converge to a solution and the precision that is desired in the location coordinates of the point on the ground. In one embodiment, the process ends when the selected point is within a predetermined limit (Δ) of the center of a final recursively partitioned quadrant in the image space. For example, this limit could be the pixel defining the exact center of the recursively partitioned quadrant.

Figure 9:
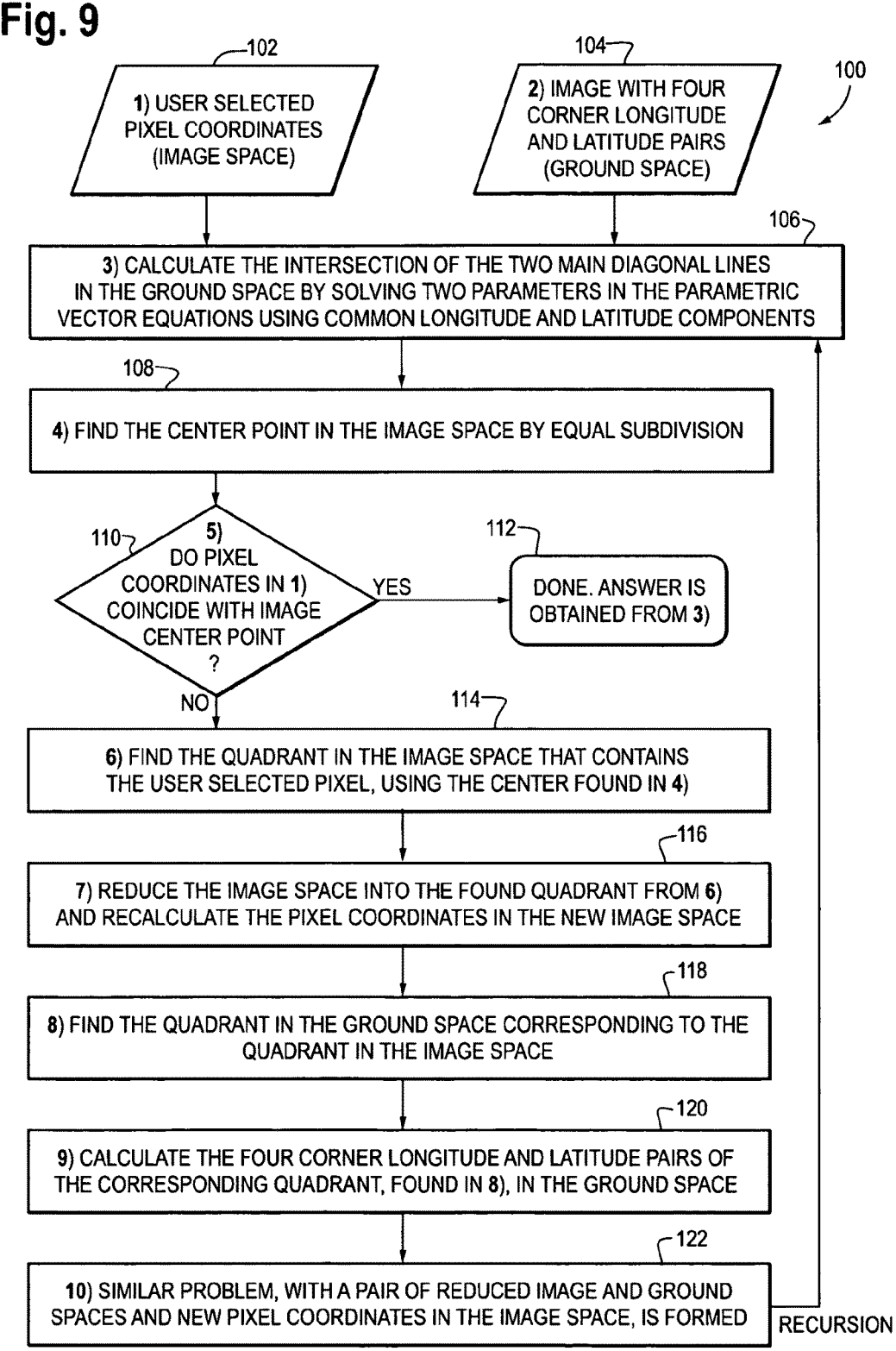
FIG. 9 is a flow chart showing a preferred implementation of the recursive quad space image processing method.

FIG. 9 is a flow chart (100) showing a preferred implementation of the recursive quad space image processing method. There are two inputs: 1) a user selection of pixel coordinates of an object of interest in a digital oblique reconnaissance image (102) (the selected point in an image space) and 2) a digital image, with known longitude and latitude coordinates of the four corner points (104) (the ground space). The image contains M columns and N rows of pixels. M and N are known or are supplied as inputs to the algorithm. Each pixel is said to have a set of coordinates (C, R) in which C ranges from 0 to (M-1) and R ranges from 0 to (N-1). All numbers are integers in the image space. The ground space image is annotated with four corner longitude X and latitude Y coordinates (e.g., contained in the NITF format header), which can be calculated using known information such as camera location and orientation, depression angle, altitude, field of view, the sensor model or otherwise. The geo-coordinates are real numbers in the ground space.

At step 106, the algorithm calculates the intersection of two main diagonal lines in the ground space. The lines are shown as lines 30 and 32 in FIG. 7. The intersection point (XC, YC) is determined by solving two parameters of the parametric vector equations defining the lines 30 and 32 using common longitude and latitude components. The process is as follows:

The diagonal lines in the ground space are represented by parametric vectors:

a. Vector P0→P3:

$$x = X0 + t0*(X3-X0) \qquad \text{i.}$$

$$y = Y0 + t0*(Y3-Y0) \qquad \text{ii.}$$

b. Vector P2→P1:

$$x = X2 + t1*(X1-X2) \qquad \text{i.}$$

$$y = Y2 + t1*(Y1-Y2) \qquad \text{ii.}$$

c. The intersection of the two vectors are at (XC, YC):

$$X0 + t0*(X3-X0) = X2 + t1*(X1-X2) \qquad \text{i.}$$

$$Y0 + t0*(Y3-Y0) = Y2 + t1*(Y1-Y2) \qquad \text{ii.}$$

d. To solve the two unknowns t0 and t1 from the two equations in c:

$$t1 = (X0 - X2 + t0*(X3-X0))/(X1-X2) \qquad \text{i.}$$

$$t1 = (Y0 - Y2 + t0*(Y3-Y0))/(Y1-Y2) \qquad \text{ii.}$$

$$(X0-X2)/(X1-X2) + t0*(X3-X0)/(X1-X2) = (Y0-Y1)/(Y1-Y2) + t0*(Y3-Y0)/(Y1-Y2) \qquad \text{iii.}$$

iv. $t0 = [(X0-X2)/(X1-X2) - (Y0-Y2)/(Y1-Y2)] / [(Y3-Y0)/(Y1-Y2) - (X3-X0)/(X1-X2)]$ iv.

e. The intersection point (XC, YC) is obtained by substituting t0 in the vector equations in a:

$$XC = X0 + t0*(X3-X0) \qquad \text{i.}$$

$$YC = Y0 + t0*(Y3-Y0) \qquad \text{ii.}$$

At step 108, the center point in the image space 12 is determined. The center point is calculated as the point having the pixel address (M/2, N/2).

At step 110, a check is made to determine whether the pixel address (C, R) for the user selected point is the center point (M/2, N/2) or not. If not, the process becomes recursive. If the answer is yes, the process is complete and the algorithm returns the coordinates (XC, YC) as the solution; the geo-location of the corresponding point in the ground space image is the coordinates (XC, YC) as calculated in part e. above under step 106. That is, the geo-location can be determined by drawing two final diagonal vectors in the final iterated ground space quadrant, and calculating the coordinates of the intersecting point (XC, YC) in this quadrant. In this example, the limit for ending the process at step 110 is that the selected point (C, R) coincides exactly with the center point of the new quadrant in the image space. In other embodiments the exact center point could be defined as being within ±n pixels from the exact center where n is some integer, say 1 or 2.

If the check at part 110 is not satisfied, the recursive process continues with steps 114-122 and then back to step 106.

In step 114, the algorithm finds the quadrant in the image space where the selected pixel is located by simple boundary comparisons. In FIG. 7, the selected pixel is located in the lower right quadrant Q3: $M/2 < C <= (M-1)$ and $N/2 < R <= (N-1)$.

At step 116, the image space is reduced (recursively reconfigured or reformed) to a new space corresponding to the quadrant which is found at step 114. A new coordinate system in the image space is formulated by translating the corresponding corner, upper-left corner in the example, of the found quadrant to the origin (0, 0). Then the pixel coordinates of the selected point (C, R) and the rest of the corner points are recalculated by the same translation to obtain the new reduced image space. In the example in which the selected point is located in quadrant Q3, the new pixel coordinates are (C−M/2, R−N/2), illustrated as (C', R') in FIG. 8.

At step 118, the algorithm finds the quadrant in the ground space 26 corresponding to the identified quadrant at step 114. As illustrated in FIG. 7, the selected point (X, Y) is located in the lower right quadrant of the ground space 26 as in the image space 12 (quadrant Q3).

At step 120, a calculation is made of the geo-location coordinates of the new four corners of the new (reduced) quadrant Q3 in the ground space 26. For near and far edges, one can use the center point in the line segment defining the edges. For the sides, the scaling factor t0 as calculated in part d) of step 106 is used. In the example of FIGS. 7 and 8, the calculations are as follows:
  a. New First Corner: (XC, YC), calculated in step 106.
  b. New Second Corner at the far edge between points P1 and P3: $((X1+X3)/2, (Y1+Y3)/2)$
  c. New Third Corner between points P2 and P3: $(X2+t0*(X3-X2), Y2+t0*(Y3-Y2))$
  d. New Fourth Corner: P3 (X3, Y3) (provided with the original image)

At step, 122 the new problem, as shown in FIG. 8, consists of a new image space 12', (reduced from quadrant Q3 in the original image space, and a new ground space 26', (also reduced from quadrant Q3 of the original ground space. Again, we have the pair of selected pixel coordinates (C', R') in the new image space. Since the query at 110 did not have a solution, a recursion as indicated at 122 occurs and the process loops back to step 106. The process repeats until the query at 110 is answered affirmatively or some other limit criterion on ending the execution of the algorithm is met.

Figure 10:
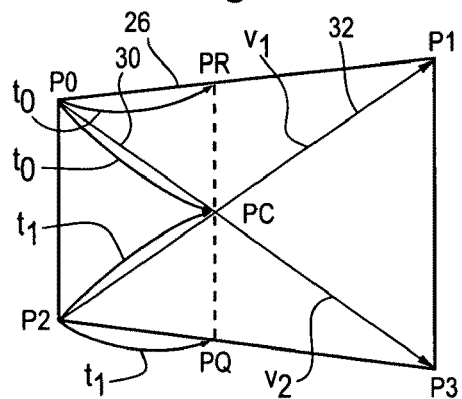
FIG. 10 is a diagram showing the scale factor to which is used in the recursive quad space image processing method as shown in FIGS. 7 and 8. The magnitude of the scale factor t0 is the distance from a corner of the image to the intersection of the diagonal vectors divided by the total distance of the diagonal vector. When the diagonal vector P0 to P3 is treated as a unit vector of magnitude 1.0, t0 represents the magnitude from the starting vector end point to the intersection of the two diagonal vectors; therefore, it is always less than 1. Parameter t0 is also applied to vector P0 P1 to find the new quadrant corner point between P0 and P1 using congruent triangles Δ P0 PC PR and Δ P0 P3 P1.

FIG. 10 is a diagram showing conceptually the scale factor to which is used in the recursive quad space image processing method and referenced in the equations of FIG. 8. The magnitude of the scale factor t0 is the distance from a corner (P0) to the intersection of the diagonal vectors 30 and 32 (PC) divided by the distance of the diagonal vector 30. Although there is a scale factor t1 on vector 32 to the same intersection point PC, t0 and t1 are typically equal when the near and far edges are parallel to each other. When the two edges are not parallel, a more elaborated method is to apply t0 to calculate quadrant mid-point PR between point P0 and P1, and apply t1 to calculate quadrant mid-point PQ between point P2 and P3. The scale factors t0 and t1 are always less than 1.

Figure 11:
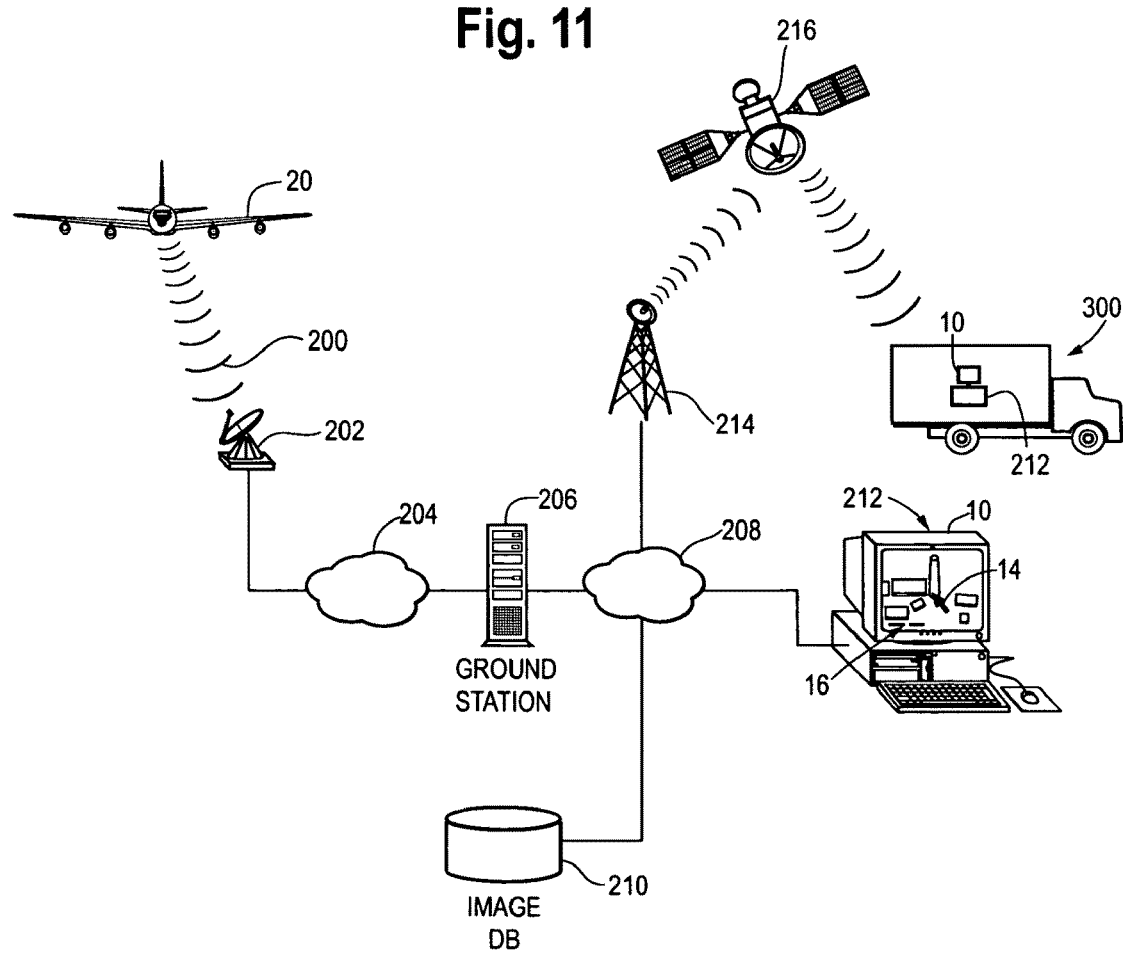
FIG. 11 is an illustration of a computer network environment in which this invention can be practiced.

The method of this disclosure has many possible implementations in workstations, ground stations, and civil service or military units such as ships, aircraft, and vehicles. FIG. 11 is an illustration of a computer network environment in which this invention can be practiced. The reconnaissance aircraft 20 includes communication apparatus (conventional) to downlink 200 digital photographs to a communications node indicated by the antenna 202. The antenna 202 is coupled via suitable electronics to a computer network 204. The images are supplied to a ground station 206. The ground station 206 consists of a data warehouse for storing and processing digital imagery. The images may further be sent over a computer network 208 to an image database 210 for later retrieval and analysis. An image exploitation workstation 212 is coupled to the network 208 and can retrieve the images either from the ground station 206 or the image database 210. The workstation 212 includes a display 10 and appropriate hardware and software for displaying the images. The image files are obtained along with the geo-location coordinates of the corner points of the image in the ground space and the image size in terms of pixels in rows and columns. The workstation 212 includes software instructions which implement the methods described above in conjunction with FIGS. 7-9 to display the image, allow the user to move the cursor over the image, and display the geo-location coordinates as indicated at 16.

Similarly, the images can be uplinked to a satellite 216 and directed over a secure channel to a mobile or stationed unit 300 such as a ship, land vehicle, etc. Unit 300 includes a workstation 212 which receives the image and a display 10 for displaying the image. The operator in the unit then places the cursor over a target in the image that is of interest. The geo-location coordinates of the target are displayed, and can be used to carry out the mission at the target location.

The invention has many commercial applications in addition to civil or military applications, including, for example, land surveying, search and rescue, mapping, and so on.

Thus, in another embodiment, the invention can take the form of an image processing apparatus (such as the workstation 212). The workstation includes a processing unit (conventional CPU, not shown), a readable memory (e.g., hard disk) storing a digital image of the earth obtained by a camera oriented at an oblique angle, the image comprising a rectangular image having four corners and corresponding to an image space, and a display 10 for displaying the image and a cursor movable by a user over the image to thereby select a point in the image, as shown in FIG. 1. The memory further stores data associated with the image comprising the geo-location coordinates for the points in the ground space corresponding to the four corners of the image, e.g., coordinate data included in the NITF header associated with the image. The memory further stores processing instructions for execution of the following steps:
  (a) performing independently and in parallel a recursive partitioning of the image space 12 and the ground space 26 into quadrants (four quadrants Q, four sub-quadrants Q', sub-sub quadrants Q" etc.) until a pixel coordinate in the image assigned to the selected point is within a predetermined limit (Δ) of the center of a final recursively partitioned quadrant in the image space (described above in conjunction with FIGS. 7-9, terminating step 110),
  (b) calculating a geo-location of the point in the ground space 26 corresponding to the selected point in the image space from the final recursively partitioned quadrant in the ground space corresponding to the final recursively partitioned quadrant in the image space (step 112 in FIG. 9). The instructions further include instructions for displaying the geo-location calculated in step (b) on the display, as indicated as 16 in FIG. 1.

In another aspect, the invention can be understood as encompassing an improvement to a workstation 212 configured to display a digital oblique aerial reconnaissance image and provide geo-location coordinates for a selected point in the image, the image corresponding to an image space, the area on the ground imaged corresponding to a ground space, the improvement comprising:

the workstation configured to perform geo-location using as inputs the pixel coordinates of the selected point in image and the geo-location coordinates of the four corners of the image; and wherein the workstation performs independently and in parallel a recursive partitioning of the image space and the ground space into quadrants until a limit is reached and calculates a geo-location in the ground space for a point corresponding to the selected point in the image space when the limit is reached, as described above.

In the above methods, the maximum number of iterations (recursions) in the method is given by the parameter L where $L = \log_2 (N)$ where N is the number of pixels in the row or column direction (assuming a square image). For example, where the image is 25 megapixels comprising an array of 5,040×5,040 pixels, the recursion depth will be at most 13 levels.

Although the geo-location accuracy of the present invention depends on the accuracy of the coordinates of the image corner points, the recursive quad space method utilized preserves the accuracy of the corner points at the calculated object point. Therefore it should be noted that use of the present invention with an optical system that more accurately defines the image corner point locations in real time, such as described by Reneker et al. in U.S. patent application Ser. No. 11/222,562 filed Sep. 8, 2005, would result in the improved accuracy of the object point coordinates and furthermore would allow compensation for variations in the optics during flight. The Reneker et al. application is hereby incorporated by reference herein in its entirety. However the additional complexity of implementing the characterization of Reneker et al. and cost of the two combined systems vs. the amount of increased improvement may favor performing the method of the present invention without any use of characterization of the camera as taught by Reneker et al.

As noted above, the method is applicable to reconnaissance images generally, including those taken at nadir, and oblique images, including forward and side oblique (i.e., the camera oriented relative to the earth's surface at some oblique angle of depression between the horizon and nadir.

While presently preferred embodiments have been described with particularity, persons skilled in the art will understand that variation from the specifics of the methodology are possible without departure from the scope of the invention. All questions concerning scope are to be answered by reference to the appended claims.

I claim:

1. A method of determining the location in space of a selected point in a digital image of the earth obtained by a camera, the image comprising a rectangular image having four corners and corresponding to an image space, wherein the digital image is associated with data indicating the geo-location coordinates for the points in the ground space corresponding to the four corners of the image, comprising the steps of:

(a) performing independently and in parallel a recursive partitioning of both the image space and the ground space into successively smaller quadrants until a pixel coordinate in the image space assigned to the selected point is within a predetermined limit ($\Delta$) of the center of a final recursively partitioned quadrant in the image space, and (b) calculating a geo-location of the point in the ground space corresponding to the selected point in the image space from the final recursively partitioned quadrant in the ground space corresponding to the final recursively partitioned quadrant in the image space;

wherein step (a) comprises the steps of:

1) calculating the intersection of two diagonal lines in the ground space;
2) finding the center point in the image space by equal subdivision;
3) determining whether the pixel coordinate of the selected point in the image is within the predetermined limit ($\Delta$) of the image center point in step 2), and if not then:
4) finding the quadrant in the image that contains the selected point using the center determined in step 2);
5) reducing the image space into a new image space corresponding to the quadrant found in step 4);
6) calculating the coordinates of the selected point in the new reduced image space quadrant;
7) finding the quadrant in the ground space corresponding to the quadrant found in step 4);
8) reducing the ground space into a new ground space corresponding to the found quadrant in step 7);
9) calculating the geo-location coordinates of the corners of the new ground space found in step 8); and
10) repeating steps 1-9 until the determination at step 3) is answered in the affirmative.

2. The method of claim 1, wherein the predetermined limit ($\Delta$) is less than or equal to one pixel.

3. The method of claim 1, wherein the digital image comprises a digital reconnaissance image formatted in accordance with a format that contains geo-location coordinates of four image corners.

4. The method of claim 1, wherein the method is performed by a computing platform incorporated into the camera.

5. The method of claim 1, wherein the method is performed by a ground station receiving the image.

6. The method of claim 1, wherein the method is performed by a workstation storing the image and displaying the image on a display associated with the workstation.

7. An image processing apparatus comprising:

a processing unit;

a machine-readable memory storing a digital image of the earth, the image comprising a rectangular image having four corners and corresponding to an image space, and a display for displaying the image and a cursor movable by a user over the image to thereby select a point in the image;

wherein the memory further stores data associated with the image comprising the geo-location coordinates for the points in the ground space corresponding to the four corners of the image, and wherein the memory further stores processing instructions for execution of the following steps:

(a) performing independently and in parallel a recursive partitioning of both the image space and the ground space into quadrants until a pixel coordinate in the image assigned to the selected point is within a predetermined limit ($\Delta$) of the center of a final recursively partitioned quadrant in the image space, (b) calculating a geo-location of the point in the ground space corresponding to the selected point in the image space from the final recursively partitioned quadrant in the ground space corresponding to the final recursively partitioned quadrant in the image space; and (c) displaying the geo-location calculated in step (b) on the display;

wherein step (a) comprises the steps of:

1) calculating the intersection of two diagonal lines in the ground space;
2) finding the center point in the image space by equal subdivision;
3) determining whether the pixel coordinate of the selected point in the image is within the predetermined limit ($\Delta$) of the image center point in step 2), and if not then:
4) finding the quadrant in the image that contains the selected point using the center determined in step 2);
5) reducing the image space into a new image space corresponding to the quadrant found in step 4);
6) calculating the coordinates of the selected point in the new reduced image space quadrant;
7) finding the quadrant in the ground space corresponding to the quadrant found in step 4);
8) reducing the ground space into a new ground space corresponding to the found quadrant in step 7);
9) calculating the geo-location coordinates of the corners of the new ground space found in step 8); and
10) repeating steps 1-9 until the determination at step 3) is answered in the affirmative.

8. The image processing apparatus of claim 7, wherein the image processing apparatus comprises a workstation coupled to a ground station.

9. The image processing apparatus of claim 7, wherein the image processing apparatus comprises an image exploitation workstation.

10. The image processing apparatus of claim 7, wherein the image processing apparatus is incorporated into a land, sea or airborne unit.

11. In a workstation configured to display a digital aerial reconnaissance image and provide geo-location coordinates for a selected point in the image, the image corresponding to an image space, the area on the ground imaged corresponding to a ground space, the improvement comprising:

the workstation configured to perform the geo-location using as inputs the pixel coordinates of a selected point in the image and the geo-location coordinates of the four corners of the image; and wherein the workstation performs independently and in parallel a recursive partitioning of both the image space and the ground space into quadrants until a pixel coordinate in the image space assigned to the Selected point is within a predetermined limit ($\Delta$) of the Center of a final recursively partitioned quadrant in the image space and calculates a geo-location in the ground space for a point corresponding to the selected point in the image when the limit is reached;

wherein the workstation includes a memory storing instructions for execution by a processing unit, and the processing unit performs the independent and parallel recursive portioning of the image space and the ground space using the instructions wherein the instructions implement the steps of:

1) calculating the intersection of two diagonal lines in the ground space;
2) finding the center point in the image space by equal subdivision;
3) determining whether the pixel coordinate of the selected point in the image is within a predetermined limit ($\Delta$) of the image center point in step 2), and if not then:
4) finding the quadrant in the image that contains the selected point using the center determined in step 2);
5) reducing the image space into a new image space corresponding to the quadrant found in step 4);
6) calculating the coordinates of the selected point in the new reduced image space quadrant;
7) finding the quadrant in the ground space corresponding to the quadrant found in step 4);
8) reducing the ground space into a new ground space corresponding to the found quadrant in step 7);
9) calculating the geo-location coordinates of the corners of the new ground space found in step 8); and
10) repeating steps 1-9 until the determination at step 3) is answered in the affirmative.

12. The workstation of claim 11, wherein the workstation comprises an image exploitation workstation.

13. The workstation of claim 12, wherein the workstation is incorporated into a land, sea or airborne unit.

14. The workstation of claim 12, wherein the digital reconnaissance image comprises an image formatted in accordance with a format that contains geo-location coordinates of four image corners.

15. The workstation of claim 11, wherein the predetermined limit ($\Delta$) is less than or equal to one pixel.

16. The method of claim 1, wherein the geo-location coordinates for the corner points in the ground space corresponding to the four corners of the image are determined using data characterizing the performance of an optical system associated with the reconnaissance camera.

17. The method of claim 1, wherein the image comprises an image obtained at an oblique angle relative to the earth's surface.

18. The apparatus of claim 7, wherein the image comprises an image obtained by a camera oriented at an oblique angle relative to the earth's surface.

* * * * *